(12) United States Patent
Lee et al.

(10) Patent No.: US 8,903,607 B2
(45) Date of Patent: Dec. 2, 2014

(54) LANE TRACKING SYSTEM WITH ACTIVE REAR-STEER

(75) Inventors: Jin-Woo Lee, Rochester Hills, MI (US); Nikolai K. Moshchuk, Grosse Pointe, MI (US); Shih-Ken Chen, Troy, MI (US); Bakhtiar Brian Litkouhi, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 231 days.

(21) Appl. No.: 13/348,091

(22) Filed: Jan. 11, 2012

(65) Prior Publication Data

US 2013/0179036 A1 Jul. 11, 2013

(51) Int. Cl.
*G05D 1/02* (2006.01)

(52) U.S. Cl.
USPC .............................................. 701/41; 180/408

(58) Field of Classification Search
CPC ................................................ B60W 2710/202
USPC .......................................................... 701/41
See application file for complete search history.

(56) References Cited

U.S. PATENT DOCUMENTS

| | | | | |
|---|---|---|---|---|
| 4,671,523 A | * | 6/1987 | Naumann | 180/412 |
| 5,076,382 A | * | 12/1991 | Vaughn et al. | 180/413 |
| 8,406,956 B2 | * | 3/2013 | Wey et al. | 701/41 |
| 2003/0045981 A1 | * | 3/2003 | Kifuku et al. | 701/41 |
| 2003/0088350 A1 | * | 5/2003 | Lin et al. | 701/41 |
| 2005/0027402 A1 | * | 2/2005 | Koibuchi et al. | 701/1 |
| 2006/0070791 A1 | * | 4/2006 | Martens et al. | 180/411 |
| 2009/0292421 A1 | * | 11/2009 | Williams et al. | 701/42 |
| 2010/0211264 A1 | * | 8/2010 | Wey et al. | 701/41 |
| 2010/0228420 A1 | | 9/2010 | Lee | |
| 2011/0106382 A1 | * | 5/2011 | Kageyama | 701/42 |
| 2012/0059547 A1 | * | 3/2012 | Chen et al. | 701/37 |
| 2012/0109411 A1 | * | 5/2012 | Tokimasa et al. | 701/1 |
| 2012/0109412 A1 | * | 5/2012 | Hanzawa et al. | 701/1 |
| 2012/0109460 A1 | * | 5/2012 | Tokimasa et al. | 701/41 |
| 2012/0109464 A1 | * | 5/2012 | Mizutani et al. | 701/42 |
| 2012/0277956 A1 | * | 11/2012 | Sasaki et al. | 701/41 |
| 2012/0319374 A1 | * | 12/2012 | Watanabe | 280/91.1 |

\* cited by examiner

*Primary Examiner* — Khoi Tran
*Assistant Examiner* — Ryan Rink
(74) *Attorney, Agent, or Firm* — Quinn Law Group, PLLC

(57) ABSTRACT

A lane tracking system for a vehicle includes a front steering controller, a rear steering controller, and a lane tracking processor. The front steering controller is configured to rotate a front wheel of the vehicle through a front steering angle in response to a front steering torque command, and the rear steering controller is configured to rotate a rear wheel of the vehicle through a rear steering angle in response to a rear steering torque command. The lane tracking processor is configured to determine a desired course of the vehicle along a roadway, estimate a trajectory of the vehicle based on sensed vehicle motion, compute an error between the determined desired course and the estimated trajectory, and provide a front steering torque command to the front steering controller, and a rear steering torque command to the rear steering controller to minimize the computed error.

19 Claims, 4 Drawing Sheets

LANE TRACKING SYSTEM WITH ACTIVE REAR-STEER

TECHNICAL FIELD

The present invention relates generally to systems for enhancing the lane tracking ability of an automobile.

BACKGROUND

Vehicle lane tracking systems may employ visual object recognition to identify bounding lane lines marked on a road. Through these systems, visual processing techniques may estimate a position between the vehicle and the respective lane lines, as well as a heading of the vehicle relative to the lane. Existing automotive vision systems may utilize forward-facing cameras that may be aimed substantially at the horizon to increase the potential field of view. When active steering systems are incorporated into the lane tracking systems, a controller may be configured to adaptively center a vehicle within a lane ("lane centering"), maintain a vehicle's position in the lane ("lane keeping"), or may be used to move steer a vehicle into an adjacent lane ("lane changing").

SUMMARY

A lane tracking system for a vehicle includes a front steering controller, a rear steering controller, and a lane tracking processor. The front steering controller is configured to rotate a front wheel of the vehicle through a front steering angle in response to a front steering torque command, and the rear steering controller is configured to rotate a rear wheel of the vehicle through a rear steering angle in response to a rear steering torque command. The lane tracking processor is configured to determine a desired course of the vehicle along a roadway, estimate a trajectory of the vehicle based on sensed vehicle motion, compute an error between the determined desired course and the estimated trajectory, and provide a front steering torque command to the front steering controller, and a rear steering torque command to the rear steering controller. The front and rear steering torque commands may be configured to minimize this computed error.

In one configuration, a magnitude of the provided rear steering torque command may be zero when a magnitude of the front steering torque command is below a predetermined threshold, and the magnitude of the provided rear steering torque command may be greater than zero when the magnitude of the front steering torque command is equal to or greater than the predetermined threshold. In another configuration, the magnitude of the provided front steering torque command may be zero when a magnitude of the rear steering torque command is below a predetermined threshold, and the magnitude of the provided front steering torque command may be greater than zero when the magnitude of the rear steering torque command is equal to or greater than the predetermined threshold.

The lane tracking processor may be further configured to determine a desired front steering angle and a desired rear steering angle, wherein the provided front steering torque command is controlled to minimize the difference between the front steering angle and the desired front steering angle, and the provided rear steering torque command is controlled to minimize the difference between the rear steering angle and the desired rear steering angle.

The desired course of the vehicle along the roadway may be determined to maintain the vehicle within the center of a traffic lane. Alternatively, the desired course of the vehicle along a roadway may be determined to effectuate a lane change maneuver. In either case, the nature of the desired course may be generally indicated by a user via an interface (e.g., "maintain current lane," "center vehicle in lane," "change lane").

Additionally, a method of controlling the motion of a vehicle may include: receiving image data and sensed vehicle motion data; determining, using a processor, a desired course of the vehicle along a roadway from the received image data and sensed vehicle motion data; and estimating, using the processor, a trajectory of the vehicle based on sensed vehicle motion. The method may further include computing an error between the determined desired course of the vehicle and the estimated trajectory of the vehicle; determining, using the processor, a desired front steering angle for a front wheel of the vehicle and a desired rear steering angle for a rear wheel of the vehicle, wherein the desired front and rear steering angles are determined to minimize the computed error; and commanding a front steering controller to rotate the front wheel through the desired front steering angle; and commanding a rear steering controller to rotate the rear wheel through the desired rear steering angle.

In one configuration, commanding a front steering controller to rotate the front wheel through the desired front steering angle may include monitoring an actual front steering angle, and providing the front steering controller with a front steering torque command that minimizes the difference between the actual front steering angle and the desired front steering angle. Likewise, commanding a rear steering controller to rotate the rear wheel through the desired rear steering angle may include monitoring an actual rear steering angle, and providing the rear steering controller with a rear steering torque command that minimizes the difference between the actual rear steering angle and the desired rear steering angle.

The above features and advantages and other features and advantages of the present invention are readily apparent from the following detailed description of the best modes for carrying out the invention when taken in connection with the accompanying drawings.

DETAILED DESCRIPTION

Figure 1:
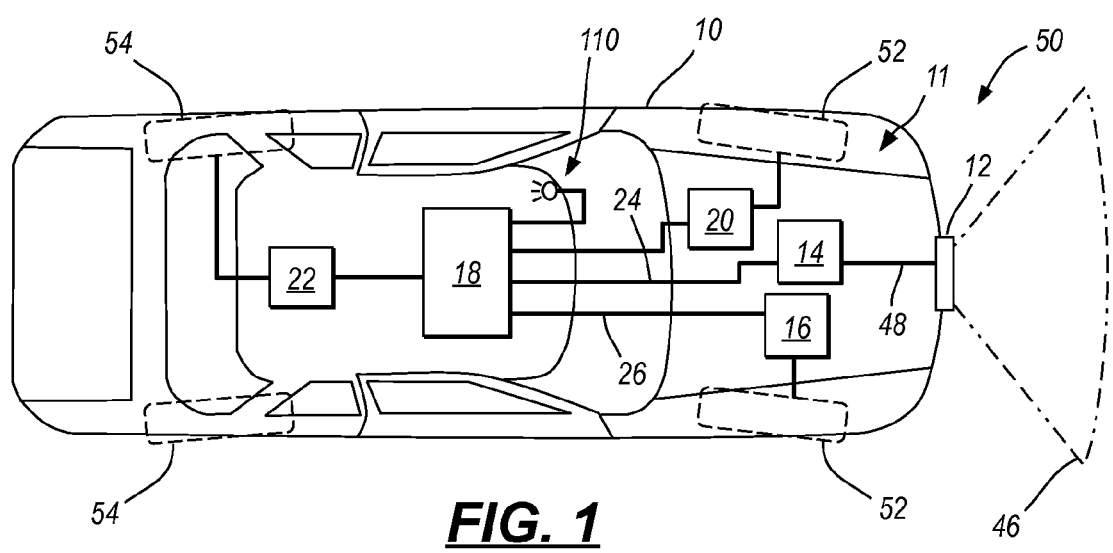
FIG. 1 is a schematic top view of a vehicle including a lane tracking system.
Figure 2:
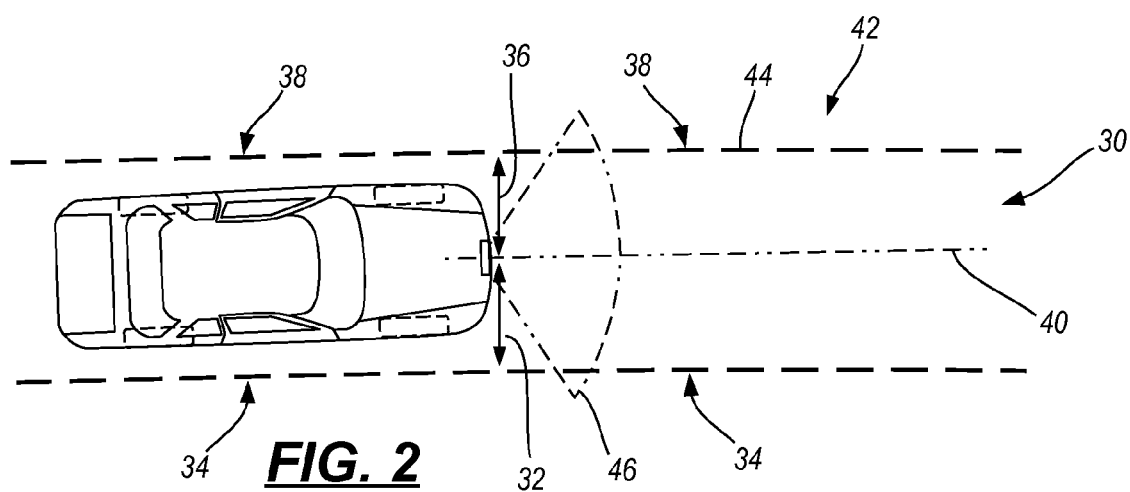
FIG. 2 is a schematic top view of a vehicle disposed within a lane of a road.

Referring to the drawings, wherein like reference numerals are used to identify like or identical components in the various views, FIG. 1 schematically illustrates a vehicle 10 with a lane tracking system 11 that includes a local-environment sensor (e.g., one or more cameras 12, laser sensors, LIDAR, GPS/mapping units, etc.), an image processor 14, a vehicle motion sensor 16, a lane tracking processor 18, and front and rear steering controllers 20, 22. As will be described in greater detail below, the lane tracking processor 18 may analyze and/or assess the captured and/or enhanced environment data 24, together with sensed vehicle motion data 26 to determine the position of the vehicle 10 within a traffic lane 30 (as generally illustrated in FIG. 2). The vehicle motion data 26 may include indications of, for example, yaw rate, speed, longitudinal and lateral acceleration, steering angle in front and rear, and/or steering torque in front and rear. Additionally, the lane tracking processor 18 may selectively control the front and rear vehicle steering (via steering controllers 20, 22) to cause the vehicle 10 to track a predefined course. Such a course may, for example, cause the vehicle 10 to remain centered within a lane 30, or may effectuate a lane change maneuver. In one configuration, the lane tracking processor 18 may determine the position of the vehicle 10 in near-real time, by computing the distance 32 between the vehicle 10 and the right lane line 34, the distance 36 between the vehicle 10 and the left lane line 38, and/or the heading 40 of the vehicle 10 relative to the lane 30.

The image processor 14 and lane tracking processor 18 may each be respectively embodied as one or multiple digital computers or data processing devices, each having one or more microprocessors or central processing units (CPU), read only memory (ROM), random access memory (RAM), electrically-erasable programmable read only memory (EEPROM), a high-speed clock, analog-to-digital (A/D) circuitry, digital-to-analog (D/A) circuitry, input/output (I/O) circuitry, power electronics/transformers, and/or signal conditioning and buffering electronics. The individual control/processing routines resident in the processors 14, 18 or readily accessible thereby may be stored in ROM or other suitable tangible memory locations and/or memory devices, and may be automatically executed by associated hardware components of the processors 14, 18 to provide the respective processing functionality. In another configuration, the video processor 14 and lane tracking processor 18 may be embodied by a single device, such as a digital computer or data processing device.

As the vehicle 10 travels along the road 42, the local-environment sensors (e.g. one or more cameras 12) may visually detect markers (e.g., road hash markers 44) that may be painted or embedded on the surface of the road 42 to define the lane 30. The cameras 12, for example, may each respectively include one or more lenses and/or filters adapted to receive and/or shape light from within the field of view 46 onto an image sensor. The image sensor may include, for example, one or more charge-coupled devices (CCDs) configured to convert light energy into a digital signal. The camera 12 may output a video feed 48, which may comprise, for example, a plurality of still image frames that are sequentially captured at a fixed rate (i.e., frame rate). In addition to one or more cameras (e.g., camera 12), the vehicle 10 may include other local-environment sensors, such as one or more radar transceivers (not shown) or other perception-sensing devices that may be used to detect the position of the vehicle relative to one or more environmental objects.

The one or more cameras 12 (or other perception-sensing devices) may be positioned in any suitable orientation/alignment with the vehicle 10, provided that they may reasonably view the one or more objects or markers disposed on or along the road 42. In one configuration, as generally shown in FIGS. 1 and 2, the camera 12 may be disposed on the forward portion 50 of the vehicle 10, such that it may suitably view the road 42 in front of the vehicle 10. For example, the camera 12 may be disposed on the front grille of the vehicle 10, or within the front windshield of the vehicle 10 and may be generally oriented in a forward facing direction.

Each of the front and rear steering controllers 20, 22 may be in communication with the lane tracking processor 18, and may be configured to respectively control the angular motion of the front and rear wheels 52, 54 at the direction of the processor 18. For example, in one configuration, the front steering controller 20 and rear steering controller 22 may each include a motor, such as a servo-motor, that may impart a torque to each of the front and rear wheels 52, 54. While FIG. 1 shows the steering controllers 20, 22 only connected to a single respective wheel, it should be understood that each of the front wheels 52 may be linked for joint motion through a steering assembly (not shown). Likewise, each of the rear wheels 54 may similarly be linked through a steering assembly (not shown) for joint motion. In an alternative embodiment, the lane tracking processor 18 may be configured to selectively control the angular motion of each wheel independently from every other wheel.

Figure 3:
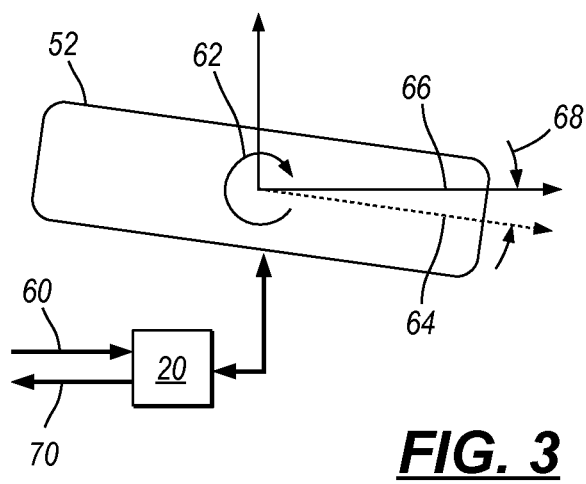
FIG. 3 is a schematic top view of a front wheel of a vehicle in communication with a steering controller.

As generally illustrated in FIG. 3, in one configuration, the front steering controller 20 may be configured to receive a torque command 60 from the lane tracking processor 18. The front steering controller 20 may then impart a torque 62 ($\tau_{front}$) to the wheel 52, such as by energizing a motor coupled with a steering assembly that may be in mechanical communication with the wheel 52. Depending on the dynamics of the vehicle 10, such as the speed, yaw, rolling friction between the wheel and the road surface, and/or other dynamic factors, the imparted torque 62 may cause the wheel heading 64 to rotate away from a nominally straight position 66 through a steering angle 68 ($\delta_{front}^{act}$). The front steering controller 20 may monitor the steering angle 68, such as through an encoder or other angular sensor, and may convey the monitored steering angle 68 back to the lane tracking processor 18 via steering angle signal 70. As may be appreciated, the rear steering controller 22 may be configured in a similar manner as the front steering controller 20, though in communication with the rear wheels 54.

Figure 4:
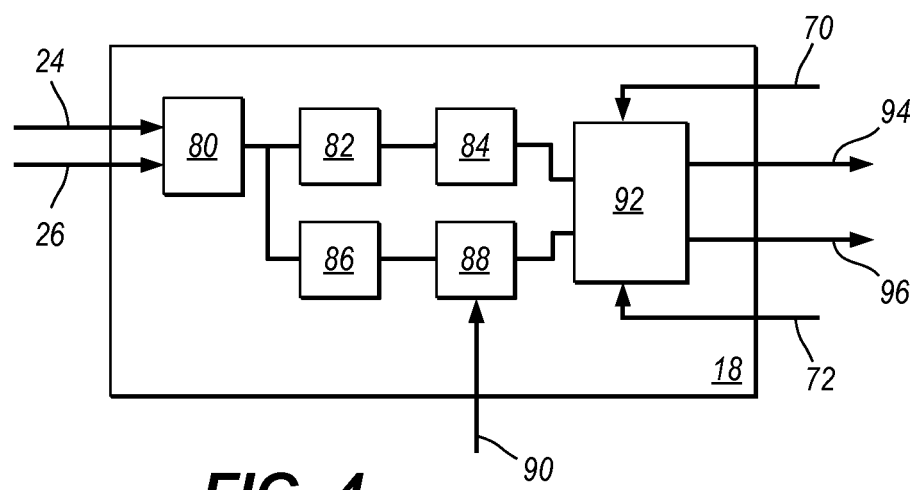
FIG. 4 is a schematic flow diagram of a lane tracking processor.

FIG. 4 illustrates a more detailed schematic view of the lane tracking processor 18. As shown, the processor 18 includes various modules that may each perform separate functions, though may be co-dependent on other modules within the processor 18. Each functional module may be embodied as one or more software algorithms, hardware circuits/devices, or may include a combination of software and hardware elements.

As shown, a sensor fusion module 80 may receive the various forms of sensory information obtained from the image processor 14, vehicle motion sensor 16, and/or other perception-based, local-environment sensors that may be included with the vehicle 10. The sensor fusion module 80 may combine these various types/forms of information into a consolidated model of the vehicle's local environment. The sensor fusion module 80 may, for example, group detected objects, track them, and report their relative object locations and relative speeds in Cartesian coordinates. In one configuration, the sensor fusion module 80 may employ various filtering techniques, such as Kalman filters, to fuse the information obtained from the various data inputs.

From this fused/consolidated model of the vehicle's local environment, a position detection module 82 may determine the vehicle's relative position within the lane (e.g., distances 32, 36 and heading 40 as shown in FIG. 2), and a path prediction module 84 may estimate/extrapolate the predicted trajectory of the vehicle 10 based on the current position of the vehicle, and the vehicle's instantaneous motion. Concurrently, a roadway estimation module 86 may determine the forward path of the roadway 42, such as through lane-line detection/analysis, while a path-planning module 88 may plot a desired course along the forward path of the roadway 42. The desired course may represent the center line of the estimated forward lane/roadway, the centerline plus an offset, or a path that would effectuate a lane change maneuver from one lane to an adjacent lane. Such a course may be generally specified by a user through a user input 90 (e.g., from a driver of the vehicle). The plotted desired course may further be a smooth path for the vehicle that minimizes any abrupt changes or motions that would otherwise provide passenger discomfort. In one configuration, the desired course may be represented as a series of lateral offsets, heading angles and longitudinal distances over a time period relative to one or more lane lines.

Figure 5:
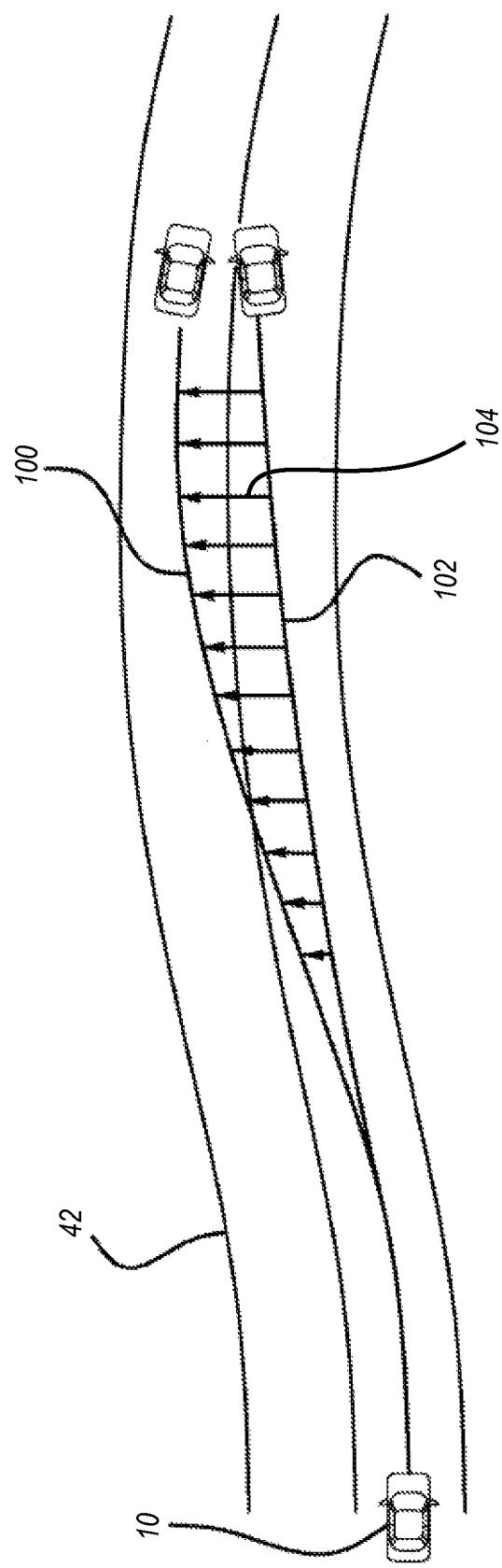
FIG. 5 is a schematic top view of a lane change procedure.

FIG. 5 is an illustration of a vehicle 10 traveling on a roadway 42, wherein the lane tracking processor 18 is attempting to effectuate a lane-change maneuver. As shown, a desired course 100 for the lane change maneuver may be generated by the path-planning module 88, and a predicted trajectory 102 under the instantaneous conditions may be generated by the path prediction module 84.

A steering control module 92 (shown in FIG. 4) may then consider the desired vehicle course 100, in view of the predicted trajectory 102, to compute the lateral offset errors 104 and/or heading angle (orientation) errors of the vehicle 10 between the desired course 100 and predicted trajectory 102. The steering control module 92 may then attempt to determine appropriate steering torque commands 94, 96 ($\tau_{front}$, $\tau_{rear}$) and/or desired steering angle commands ($\delta_{front}^{des}$, $\delta_{rear}^{des}$) for the respective front and rear steering controllers 20, 22. In one configuration, the steering control module 92 may generate a sequence of future torque commands and/or desired steering angle commands that may attempt to minimize the orientation errors and lateral offset errors 104 between the vehicle's desired course 100 and the predicted vehicle trajectory 102.

In one configuration, the steering control module 92 may determine and/or specify forward motion through a sequence of desired steering angle commands ($\delta_{front}^{des}$, $\delta_{rear}^{des}$), though may command the front and rear steering controllers 20, 22 by providing steering torque commands 94, 96 ($\tau_{front}$, $\tau_{rear}$). Based on the dynamics of the vehicle and/or wheels, the provided torque commands 94, 96 ($\tau_{front}$, $\tau_{rear}$) may then rotate the wheels through actual steering angles ($\delta_{front}^{act}$, $\delta_{rear}^{act}$) (as illustrated in FIG. 3). In this manner, and as described above, the steering control module 92 may receive monitored steering angle signals 70, 72 as feedback from the respective front and rear steering controllers 20, 22 for use in controlling the provided torque commands 94, 96 ($\tau_{front}$, $\tau_{rear}$) in a closed loop manner (i.e., to minimize the difference between the actual steering angles and the desired steering angles).

The front and rear steering torque commands 94, 96 ($\tau_{front}$, $\tau_{rear}$) may be controlled in varying proportions/schemes, relative to each other, according to the desired performance characteristics of the system 11. For example, in one configuration, the system 11 may be a front-first system, whereby the rear steering torque command 96 ($\tau_{rear}$) is zero until the front steering torque command 94 ($\tau_{front}$) exceeds a predefined threshold. In another configuration, the system 11 may be a rear-first system, whereby the front steering torque command 94 ($\tau_{front}$) is zero until the rear steering torque command 96 ($\tau_{rear}$) exceeds a predefined threshold. In still another configuration, the front and rear steering torque commands 94, 96 ($\tau_{front}$, $\tau_{rear}$) may always be used together, though may be weighted according to a predetermined proportion.

Figure 6:
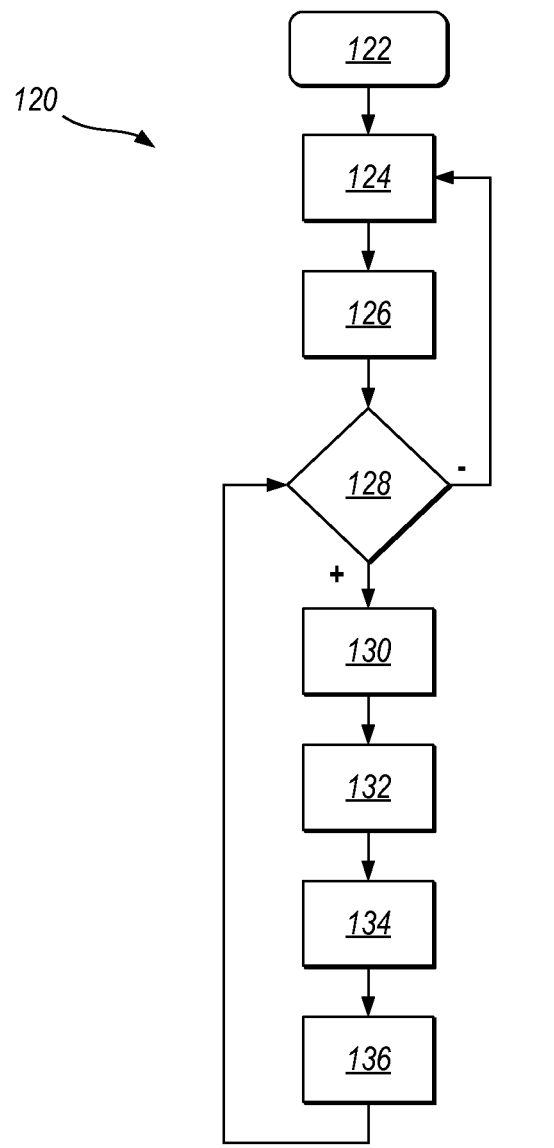
FIG. 6 is a schematic flow diagram illustrating a method of implementing a front-first steering system.

FIG. 6 schematically illustrates a method 120 of implementing a front-first steering system, such as may be executed by the lane tracking processor 18. It should be appreciated that a person skilled in vehicle dynamics may readily adapt this method 120 for a rear-first steering system. As shown, the method 120 begins at step 122 when a lane centering (or lane change) request is made of the processor 18. This request may be made, for example, by a driver/user of the vehicle 10, such as through a human-machine interface (HMI) within the cabin of the vehicle 10 (see, for example, HMI 110 in FIG. 1).

Following the initial request at step 122, the processor 18 may engage a front-steer lane centering algorithm at step 124. In this step, the processor 18 may attempt to determine a desired front steering angle ($\delta_{front}^{des}$) that minimizes the cost function ($J_1$) in Equation 1 over the forward-looking time interval [0, $\Delta T$].

$$J_1 = \int_0^{\Delta t} \left\{ [y \quad \varphi]_{err} \cdot Q(t) \begin{bmatrix} y \\ \varphi \end{bmatrix}_{err} + \delta_{front}^{des} \cdot R(t) \cdot \delta_{front}^{des} \right\} dt \quad \text{Equation 1}$$

As used in Equation 1, Q(t) and R(t) are weighting factors, $y_{err}$ represents the lateral offset error 104 between the desired course 100 and the projected trajectory 102, and $\varphi_{err}$ represents the orientation/heading error of the vehicle 10 along the projected trajectory 102 relative to the desired heading along the desired course 100. This analysis may further consider the vehicle dynamics, such as described in Equation 2, when determining the sequence of steering commands.

$$\begin{bmatrix} \dot{y} \\ \dot{\varphi} \\ \dot{v}_y \\ \dot{r} \end{bmatrix} = \begin{bmatrix} 0 & v_x & 1 & 0 \\ 0 & 0 & 0 & 1 \\ 0 & 0 & -\frac{C_f + C_r}{mv_x} & \frac{bC_r - aC_f}{mv_x} - v_x \\ 0 & 0 & \frac{bC_r - aC_f}{Iv_x} & \frac{a^2C_f + b^2C_r}{Iv_x} \end{bmatrix} \cdot \begin{bmatrix} y \\ \varphi \\ v_y \\ r \end{bmatrix} + \quad \text{Equation 2}$$

$$\begin{bmatrix} 0 \\ 0 \\ \frac{C_f}{m} \\ \frac{aC_f}{I} \end{bmatrix} \cdot \delta_{front}^{des} + \begin{bmatrix} 0 \\ v_x \\ 0 \\ 0 \end{bmatrix} \cdot \rho$$

As used in Equation 2, $v_x$ represents the vehicle's longitudinal speed, $v_y$ represents the vehicle's lateral speed, r represents the vehicle yaw rate, $\rho$ represents the road curvature, $C_f$ and $C_r$ represent the front and rear cornering stiffnesses, m represents the vehicle's mass, I represents the vehicle's yaw inertia, and a and b represent the distance between the vehicle's center of mass and the respective front and rear axles.

Once the desired front steering angle ($\delta_{front}^{des}$) is determined in step 124, the front steering controller 20 may be directed to achieve this steering angle in step 126, such as through closed loop control of the front steering torque command 94 ($\tau_{front}$).

The processor 18 may monitor the commanded front steering torque command 94 ($\tau_{front}$) in step 128 to determine if it exceeds a predetermined threshold. In one configuration, a suitable threshold for passenger comfort or for vehicle stability may be, for example, 3 Nm. A torque command over this threshold may occur, however, if the desired front steering angle ($\delta_{front}^{des}$) is commanded to change too quickly, if the vehicle 10 is already cornering and has a large lateral acceleration or yaw, if the vehicle 10 is moving at a slow rate of speed, and/or if the front steering controller 20 has become inoperative. If the predetermine torque threshold is exceeded in step 128, the processor 18 may immediately re-calculate the desired course 100 in step 130, taking into account the vehicle's current position and motion. The processor 18 may then compute/extrapolate the vehicle's current trajectory 102 in step 132, based on the front steering torque command 94

($\tau_{front}$) being artificially saturated/limited at the predetermined threshold from step 128.

Once the desired course 100 and projected trajectory 102 are respectively updated in steps 130 and 132, the processor 18 may compute the desired rear steering angle command in ($\delta_{rear}^{des}$) step 134 that may be needed to augment the artificially limited front steering torque command 94 ($\tau_{front}$). In one configuration, this determination may be accomplished by minimizing the cost function ($J_2$) stated in Equation 3, in view of the vehicle dynamics, such as stated in Equation 4.

$$J_2 = \int_0^{\Delta t} \left\{ [y \ \varphi]_{err} \cdot Q(x) \cdot \begin{bmatrix} y \\ \varphi \end{bmatrix}_{err} + \delta_{front}^{des} \cdot R(t) \cdot \delta_{front}^{des} \right\} dt \quad \text{Equation 3}$$

$$\begin{bmatrix} \dot{y} \\ \dot{\varphi} \\ \dot{v}_y \\ \dot{r} \end{bmatrix} = \begin{bmatrix} 0 & v_x & 1 & 0 \\ 0 & 0 & 0 & 1 \\ 0 & 0 & -\frac{C_f + C_r}{mv_x} & \frac{bC_r - aC_f}{mv_x} - v_x \\ 0 & 0 & \frac{bC_r - aC_f}{Iv_x} & \frac{a^2C_f + b^2C_r}{Iv_x} \end{bmatrix} \cdot \begin{bmatrix} y \\ \varphi \\ v_y \\ r \end{bmatrix} + \quad \text{Equation 4}$$

$$\begin{bmatrix} 0 \\ 0 \\ \frac{C_f}{m} \\ \frac{aC_f}{I} \end{bmatrix} \cdot \delta_{front}^{act} + \begin{bmatrix} 0 \\ 0 \\ \frac{C_r}{m} \\ -\frac{aC_r}{I} \end{bmatrix} \cdot \delta_{rear}^{des} + \begin{bmatrix} 0 \\ v_x \\ 0 \\ 0 \end{bmatrix}.$$

As used in Equation 4, the front steering angle ($\delta_{front}^{act}$) may be a measured quantity, such as through the front steering angle signal 70.

In step 136, the processor 18 may then output a rear steering torque command 96 ($\tau_{rear}$) the rear steering controller 22 in a closed-loop manner, to achieve the desired rear steering angle ($\delta_{rear}^{des}$). The method 120 may then loop back to step 128 and re-compare the commanded front steering torque command 94 ($\tau_{front}$) to the predetermined threshold.

In a configuration where both front and rear steering control are always active, the processor may attempt to select the front and rear steering torque commands 94, 96 ($\tau_{front}$, $\tau_{rear}$) (or desired front/rear steering angles ($\delta_{front}^{des}$, $\delta_{rear}^{des}$)) that most smoothly cause the vehicle 10 to follow the desired course 100. For example, the processor 18 may attempt to minimize the cost function ($J_3$) shown in Equation 5, in view of the vehicle dynamics, such as stated in Equation 6. As used in Equations 5 and 6, $u=[\delta_{front}^{des}, \delta_{rear}^{des}]$ $$J_3 = \int_0^{\Delta t} \left\{ [y \ \varphi]_{err} \cdot Q(t) \begin{bmatrix} y \\ \varphi \end{bmatrix}_{err} + u' \cdot R(t) \cdot u \right\} dt \quad \text{Equation 5}$$

$$\begin{bmatrix} \dot{y} \\ \dot{\varphi} \\ \dot{v}_y \\ \dot{r} \end{bmatrix} = \begin{bmatrix} 0 & v_x & 1 & 0 \\ 0 & 0 & 0 & 1 \\ 0 & 0 & -\frac{C_f + C_r}{mv_x} & \frac{bC_r - aC_f}{mv_x} - v_x \\ 0 & 0 & \frac{bC_r - aC_f}{Iv_x} & \frac{a^2C_f + b^2C_r}{Iv_x} \end{bmatrix} \cdot \begin{bmatrix} y \\ \varphi \\ v_y \\ r \end{bmatrix} + \quad \text{Equation 6}$$

$$\begin{bmatrix} 0 & 0 \\ 0 & 0 \\ \frac{C_f}{m} & \frac{C_r}{m} \\ \frac{aC_f}{I} & -\frac{aC_r}{I} \end{bmatrix} u + \begin{bmatrix} 0 \\ v_x \\ 0 \\ 0 \end{bmatrix} \cdot \rho.$$

By enabling active rear-steer in one of the manners described above, the vehicle 10 may be capable of tracking a lane 30 more effectively, even at slower speeds or in stop & go traffic, which may require greater steering torques. Incorporation of joint front and rear steering may therefore provide a more robust active cruise control/lane keeping system across a broad range of speeds and road geometries than merely relying on front-steer alone.

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. A lane tracking system for a vehicle having a front wheel and a rear wheel, the lane tracking system comprising:
   a front steering controller configured to rotate the front wheel of the vehicle through a front steering angle in response to a front steering torque command;
   a rear steering controller configured to rotate the rear wheel of the vehicle through a rear steering angle in response to a rear steering torque command; and
   a lane tracking processor configured to:
      determine a desired course of the vehicle along a roadway;
      estimate a trajectory of the vehicle based on sensed vehicle motion;
      compute an error between the determined desired course and the estimated trajectory; and
      provide a front steering torque command to the front steering controller, and a rear steering torque command to the rear steering controller, the provided front steering torque command and rear steering torque command being selected to minimize the computed error and being limited to not exceed a predetermined maximum torque;
      wherein one of the front steering torque command and the rear steering torque command is zero until the other of the front steering torque command and the rear steering torque command equals the predetermined maximum torque.

2. The lane tracking system of claim 1, wherein a magnitude of the provided rear steering torque command is zero when a magnitude of the front steering torque command is below the predetermined maximum torque; and
   wherein the magnitude of the provided rear steering torque command is greater than zero when the magnitude of the front steering torque command is equal to the predetermined maximum torque.

3. The lane tracking system of claim 1, wherein a magnitude of the provided front steering torque command is zero when a magnitude of the rear steering torque command is below the predetermined maximum torque; and
   wherein the magnitude of the provided front steering torque command is greater than zero when the magnitude of the rear steering torque command is equal to the predetermined maximum torque.

4. The lane tracking system of claim 1, wherein the lane tracking processor is further configured to determine a desired front steering angle and a desired rear steering angle;
   wherein the provided front steering torque command is controlled to minimize the difference between the front steering angle and the desired front steering angle; and
   wherein the provided rear steering torque command is controlled to minimize the difference between the rear steering angle and the desired rear steering angle.

5. The lane tracking system of claim 1, wherein the desired course of the vehicle along a roadway is determined to maintain the vehicle within the center of a traffic lane.

6. The lane tracking system of claim 1, wherein the desired course of the vehicle along a roadway is determined to effectuate a lane change maneuver.

7. The lane tracking system of claim 1, wherein the computed error includes a lateral offset error and a heading angle error.

8. The lane tracking system of claim 1, wherein determining a desired course of the vehicle includes receiving an indication from a user, wherein the indication specifies one of a lane centering command and a lane change command.

9. The lane tracking system of claim 1, further comprising a camera configured to generate image data representative of the roadway and a vehicle motion sensor configured to generate vehicle motion data representative of sensed vehicle motion; and wherein the lane tracking processor further includes a sensor fusion module configured to fuse the image data with the vehicle motion data to form a consolidated model of the local vehicle environment.

10. The lane tracking system of claim 9, wherein the lane tracking processor is configured to determine a forward path of the roadway from the consolidated model.

11. A method of controlling the motion of a vehicle comprising:

receiving image data and sensed vehicle motion data;

determining, using a processor, a desired course of the vehicle along a roadway from the received image data and sensed vehicle motion data;

estimating, using the processor, a trajectory of the vehicle based on sensed vehicle motion;

computing an error between the determined desired course of the vehicle and the estimated trajectory of the vehicle;

determining, using the processor, a desired front steering angle for a front wheel of the vehicle and a desired rear steering angle for a rear wheel of the vehicle, the desired front and rear steering angles determined to minimize the computed error;

commanding a front steering controller to rotate the front wheel through the desired front steering angle by:
monitoring an actual front steering angle;
providing the front steering controller with a front steering torque command that minimizes a difference between the actual front steering angle and the desired front steering angle;

commanding a rear steering controller to rotate the rear wheel through the desired rear steering angle by:
monitoring an actual rear steering angle;
providing the rear steering controller with a rear steering torque command that minimizes a difference between the actual rear steering angle and the desired rear steering angle;

wherein at least one of the front steering torque and the rear steering torque is limited to not exceed a predetermined maximum torque; and wherein one of the front steering torque command and the rear steering torque command is zero until the other of the front steering torque command and the rear steering torque command equals the predetermined maximum torque.

12. The method of claim 11, wherein a magnitude of the provided rear steering torque command is zero when a magnitude of the front steering torque command is below the predetermined maximum torque; and wherein the magnitude of the provided rear steering torque command is greater than zero when the magnitude of the front steering torque command is equal to the predetermined maximum torque.

13. The method of claim 11, wherein a magnitude of the provided front steering torque command is zero when a magnitude of the rear steering torque command is below the predetermined maximum torque; and wherein the magnitude of the provided front steering torque command is greater than zero when the magnitude of the rear steering torque command is equal to or greater than the predetermined maximum torque.

14. The method of claim 11, wherein the desired course of the vehicle along a roadway is determined to maintain the vehicle within the center of a traffic lane.

15. The method of claim 11, wherein the desired course of the vehicle along a roadway is determined to effectuate a lane change maneuver.

16. The method of claim 11, wherein the computed error includes a lateral offset error and a heading angle error.

17. The method of claim 11, wherein determining a desired course of the vehicle includes receiving an indication from a user, wherein the indication specifies one of a lane centering command and a lane change command.

18. The lane tracking system of claim 1, wherein the predetermined maximum torque is 3 Nm.

19. The method of claim 11, wherein the predetermined maximum torque is 3 Nm.

* * * * *